(12) United States Patent
Sanderson et al.

(10) Patent No.: US 8,528,863 B2
(45) Date of Patent: Sep. 10, 2013

(54) MULTI-LAYER METAL/SHAPE MEMORY POLYMER ROLL-UP WING STRUCTURES FOR FITMENT-CONSTRAINED AIR VEHICLES

(75) Inventors: Terry M. Sanderson, Tucson, AZ (US); Brian J. Gowler, Tucson, AZ (US); David R. Sar, Corona, CA (US); Thomas P. McCreery, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1396 days.

(21) Appl. No.: 12/463,400

(22) Filed: May 10, 2009

(65) Prior Publication Data
US 2010/0282906 A1 Nov. 11, 2010

(51) Int. Cl.
*B64C 3/20* (2006.01)
*B64C 3/56* (2006.01)

(52) U.S. Cl.
USPC ......... 244/123.5; 244/3.27; 244/49; 244/99.8

(58) Field of Classification Search
USPC .......... 244/46, 49, 3.27, 3.29, 123.1, 123.11, 244/123.5, 133, 99.8
See application file for complete search history.

(56) References Cited

U.S. PATENT DOCUMENTS

| | | | | |
|---|---|---|---|---|
| 4,485,991 A | * | 12/1984 | Fuller | 244/49 |
| 5,114,104 A | * | 5/1992 | Cincotta et al. | 244/99.8 |
| 5,927,643 A | * | 7/1999 | Figge, Sr. | 244/3.27 |
| 5,934,609 A | * | 8/1999 | Kuklinski | 244/99.8 |
| 6,182,929 B1 | * | 2/2001 | Martin et al. | 244/219 |
| 6,872,433 B2 | * | 3/2005 | Seward et al. | 428/36.9 |
| 7,306,187 B2 | * | 12/2007 | Lavan | 244/49 |
| 7,331,546 B2 | * | 2/2008 | Ifju et al. | 244/123.1 |
| 7,550,189 B1 | * | 6/2009 | McKnight et al. | 244/99.8 |
| 7,728,267 B2 | * | 6/2010 | Sanderson et al. | 244/99.8 |
| 7,777,165 B2 | * | 8/2010 | Sanderson et al. | 244/99.8 |
| 7,798,443 B2 | * | 9/2010 | Hamilton et al. | 244/99.8 |
| 7,887,734 B2 | * | 2/2011 | Sanderson | 264/313 |
| 7,892,630 B1 | * | 2/2011 | McKnight et al. | 428/212 |

(Continued)

OTHER PUBLICATIONS

Sara Black, "The changing shape of future aircraft" Composites World, Sep. 1, 2006, pp. 1-3.
M A Di Prima "Thermo-mechanical behavior of epoxy shape memory polymer foams" Smart materials and Structures 16 (2007) 2330-2340, Oct. 12, 2007.

(Continued)

*Primary Examiner* — Tien Dinh
*Assistant Examiner* — Steven Hawk
(74) *Attorney, Agent, or Firm* — Eric A. Gifford

(57) ABSTRACT

A laminated wing structure includes at least one layer of metal material and at least one layer of a shape memory polymer (SMP) material. The SMP is heated to a temperature in its glass transition band Tg to roll the wing around the air vehicle into a stored position. The metal layer(s) must be thin enough to remain below its yield point when rolled up. In preparation for launch, the SMP material is thermally activated allowing the strain energy stored in the layer of metal material to return the wing to its deployed position at launch. Once deployed, the SMP cools to its glassy state. The SMP material may be reinforced with fiber to form a polymer matrix composite (PMC). SMP may be used to provide shear strain relief for multiple metal layers. By offloading the motive force required to return the wing to its original deployed position from the SMP to the metal, the polymer does not acquire a permanent set and the wing may be deployed accurately.

20 Claims, 6 Drawing Sheets

(56) References Cited

U.S. PATENT DOCUMENTS

| | | | |
|---|---|---|---|
| 7,901,524 B1* | 3/2011 | McKnight et al. | 244/99.8 |
| 7,938,923 B2* | 5/2011 | Hood | 156/94 |
| 8,007,705 B2* | 8/2011 | Sanderson | 264/313 |
| 8,092,188 B2* | 1/2012 | Rosati et al. | 416/229 A |
| 8,201,773 B1* | 6/2012 | Durham et al. | 244/99.8 |
| 2002/0142119 A1* | 10/2002 | Seward et al. | 428/36.9 |
| 2004/0245393 A1* | 12/2004 | Ifju et al. | 244/123 |
| 2006/0284005 A1* | 12/2006 | Ifju et al. | 244/49 |
| 2008/0314510 A1* | 12/2008 | Hood | 156/221 |
| 2009/0072094 A1* | 3/2009 | Sanderson et al. | 244/218 |
| 2009/0175726 A1* | 7/2009 | Rosati et al. | 416/147 |
| 2009/0206192 A1* | 8/2009 | Sanderson et al. | 244/99.8 |
| 2009/0235494 A1* | 9/2009 | Browne et al. | 24/16 R |
| 2010/0230850 A1* | 9/2010 | Sanderson | 264/164 |
| 2010/0230859 A1* | 9/2010 | Sanderson | 264/294 |
| 2011/0001018 A1* | 1/2011 | Hamilton et al. | 244/35 R |

OTHER PUBLICATIONS

Vijay Jagdale "Experimental characterization of load stiffening wing for small UAV" Society for Experimental Mechanics Annual Conference, Springfield, MA Jun. 4-7, 2007.

Baron Johnson "Development of a composite bendable-wing micro air vehicle" 45 AIAA Aerospace Sciences Meeting and Exhibit Jan. 8-11, 2007, Reno, Nevada AIAA 2007-1044.

Andreas Lendlein "Shape-memory polymers" Angew Chem. Int. Ed. 2002, 41 2034-2057.

John K H Lin "Shape memory rigidizable inflatable (RI) structures for large space systems applications" 47th AIAA/ASME/ASCE/AHSA/ASC Structures, Structural Dynamics and Materials Conference May 1-4, 2006.

Michael Milstein "Shape-memory polymers and other technologies may create an airplane for all missions" Air & Space Magazine, Mar. 1, 2007.

* cited by examiner

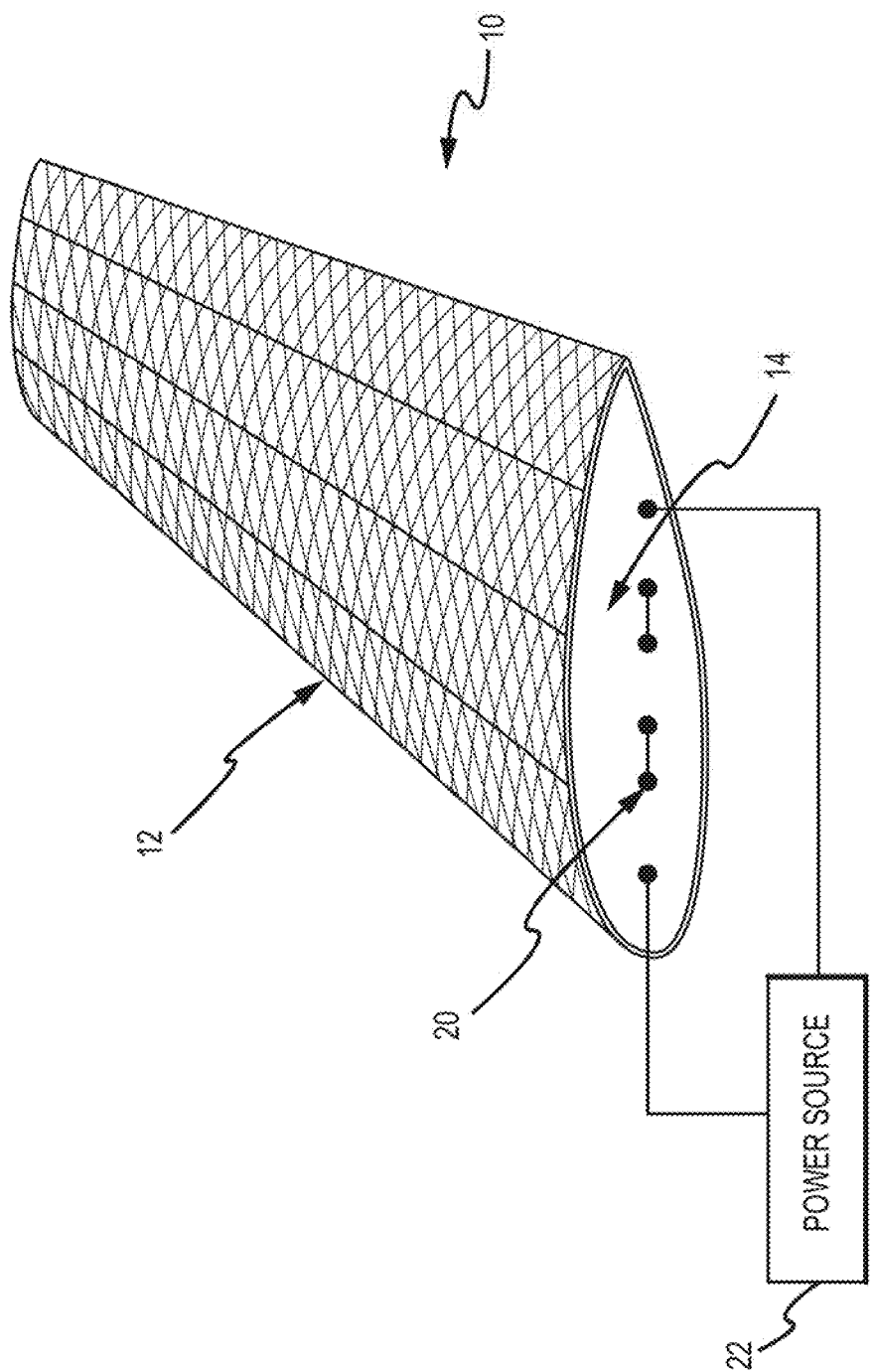

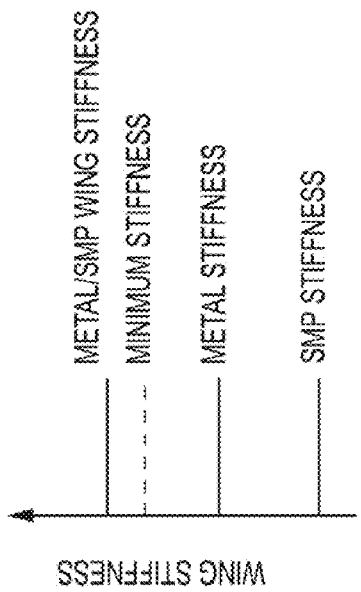
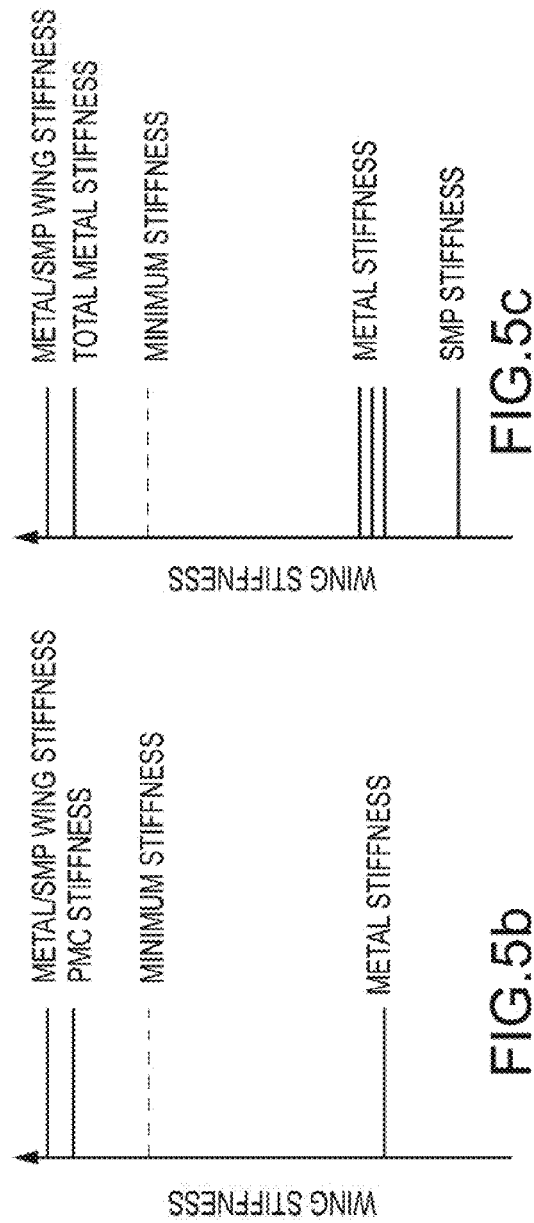

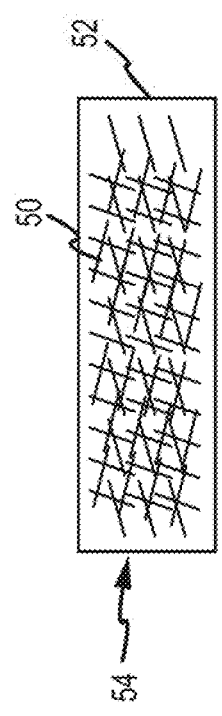
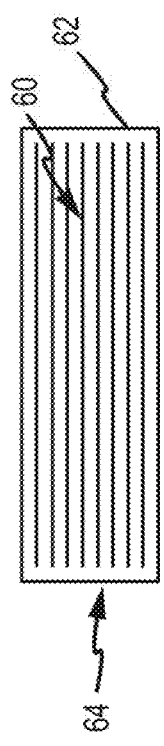
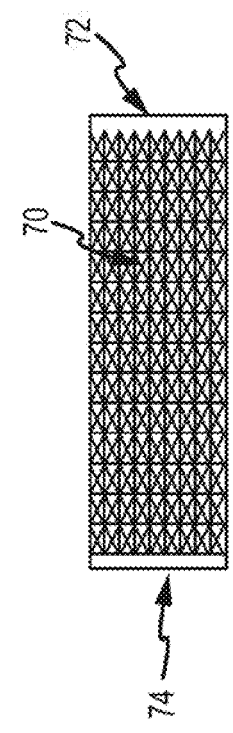
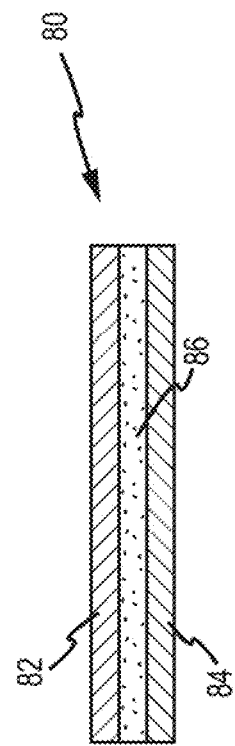

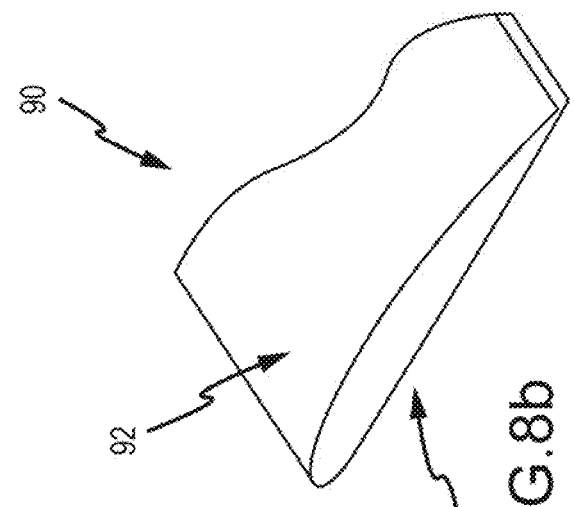
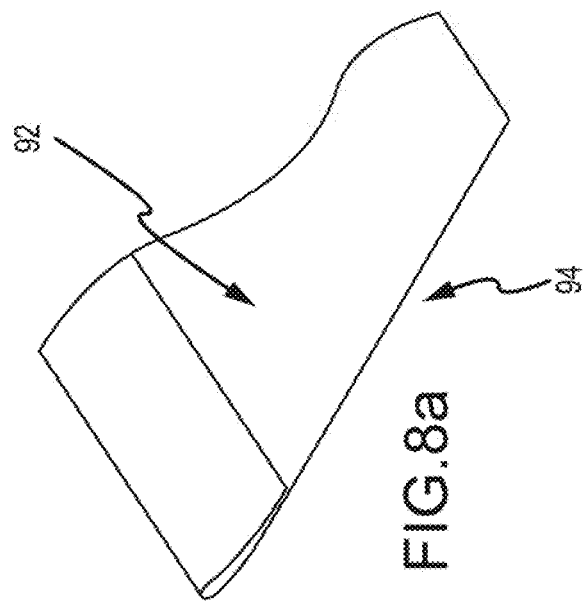

MULTI-LAYER METAL/SHAPE MEMORY POLYMER ROLL-UP WING STRUCTURES FOR FITMENT-CONSTRAINED AIR VEHICLES

BACKGROUND OF THE INVENTION

1. Field of the Invention

This invention relates to wings for fitment-constrained air vehicles, and more particularly to wings for tube and pylon launched missiles, projectiles and unmanned aerial vehicles (UAVs) or micro aerial vehicles (MAVs).

2. Description of the Related Art

Air vehicles such as missiles, projectiles and unmanned aerial vehicles (UAVs) or micro aerial vehicles (MAVs) are often launched from ground, air or sea based tube or pylon launch platforms. These vehicles range from a fraction of a pound for MAVs to upwards of 10,000 pounds for large cruise missiles and munitions, and fly with speeds ranging from a few miles per hour to transonic, i.e. around Mach 1. These launch platforms are "fitment" constrained in space and volume e.g. the limited volume of a tube or the limited volume inside or under an airframe. To utilize the available space and volume, these vehicles typically employ retractable wings that are stored inside the airframe and deploy at launch. As used herein a "wing" is any aerodynamic surface that provides flight control and/or lift generation including wings, fins and canards.

Retractable wings are typically formed of machined aluminum. Machined aluminum wings can withstand the heavy loads imparted by transonic flight and/or rapid maneuvering. Aluminum is easily machined to satisfy close tolerances on the "outer mold line" (OML) of the wing. A tight OML tolerance is critical to provide minimal disturbance in aerodynamic performance that could create roll/pitch moments, drag, etc. However, the wings are limited to have a 'chord' length "d" less than the diameter of the vehicle and a span length "l" less than the length of the air frame in order to fully retract inside the air frame for storage.

As customer demands on the performance of these types of air vehicles increases and the fitment constraints are restricted further, the limitations on chord and span lengths provide inadequate endurance (range) and control to fly desired missions. By comparison, commercial manned aircraft typically have a chord length that is 3×-4× the diameter of the airframe and a span length of 2× the length of the of the air frame to provide sufficient wing surface area to provide lift at low speeds for efficient flight and maneuverability.

The University of Florida has developed a bendable wing for MAVs (U.S. Pat. No. 7,331,546). The wing may be rolled up around the airframe and the MAV stored in a small cylindrical tube. Upon release, the wing returns to its original position for flight. MAVs are very small, lightweight vehicles that fly at relatively low speeds; hence the loading on the wings is fairly small. The wing is formed from one or more layers of resilient materials such that the wing is bendable from its original position. The resilient materials may include fiber reinforced laminates and fabrics such as carbon fiber reinforced polymers, glass reinforced polymers and aramid reinforced polymers; sheet metal such as spring steel, high strength aluminum, stainless steel and titanium; foam materials; and plastics. The wing returns to its original shape because the elastic characteristics of the wing causes the wing to remain under forces when bent from its original position. These forces abate only when the wing is returned to its original position. The materials used to form the wing have great flexibility and elasticity and bend rather than permanently yielding. Thus the MAV needs only to be removed from a storage container for the wing to return to its original shape. The wing returns to its original shape "without additional steps or use of mechanical mechanisms, such as servos, motors, piezoelectrics, or shape memory alloys."

Polymers exhibit a glass transition temperature or band of temperatures Tg in which the transition from a glassy state below Tg to an elastomeric state above Tg. Many polymers are formulated for use exclusively in their elastomeric state. If the temperature is reduced below Tg the polymer becomes very brittle and not useful. Other polymers are formulated for use exclusively in their glassy state. If the temperature exceeds Tg, the polymers will decompose and oxidize. An important sub-class of polymers known as "Shape Memory Polymers" (SMPs) are stable (mechanically/chemically/thermally) above and below the glass transition. Virtually any polymer family can be made in an SMP formulation today. The choice as to which polymer is used will depend upon the application. In their elastomeric state the SMPs can be stretched and otherwise deformed. In their glassy state, the SMPs exhibit a high Young's Modulus (at least 10× that in the elastomeric state). The SMP can be deformed from its original shape to some desired shape while in the elastomeric state and then cooled to the glassy state to hold the desired shape. Microscopic strain energy is stored in the molecular strands that provide a small motive force. This sub-class of polymers gets their name from the fact that when the material is reheated to above Tg the SMP returns to its original or "memorized" shape. SMPs have been proposed for use as a deployment mechanism in space-based systems for antennas or solar arrays. In space, the "loads" are minimal because of the lack of atmosphere and gravity. Consequently the motive force of the "memory effect" albeit quite small may be sufficient to deploy certain systems. SMPs have also been proposed for use as a "skin" for reconfigurable wings in aircraft. The skin would be heated to above Tg, the wing reconfigured via actuators and a support structure and then the skin cooled to below Tg to provide a stiff skin. In this case, the motive force of the shape memory effect is negligible.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a roll-up wing for fitment constrained air vehicles.

This is accomplished with a laminated wing structure including at least one layer of metal material and at least one layer of a shape memory polymer (SMP) material. Each metal layer must be thin enough to remain below its yield point when rolled up. The SMP material is characterized by a glass transition band Tg above which the SMP material is in an elastomeric state and below which the material is in a glassy state. A first means is provided for heating the SMP material to a temperature in the glass transition band Tg to roll the wing around the air vehicle into a stored position. The SMP material cools to its glassy state for storage. By "packing" the SMP material while in its transition band minimal strain energy is stored in the material. As a result, the SMP material will not acquire a permanent set within the storage life of the vehicle and the wing may be accurately returned to the original deployed position. However, to avoid permanent set the SMP material will not store sufficient strain energy to return the wing to its deployed position. A second means heats the SMP material to a temperature in or above the glass transition band Tg softening the SMP, allowing the strain energy stored in the layer(s) of metal material to return the wing to its deployed position at launch. Once deployed, the SMP will typically cool and transition to its glassy state. The SMP material may be reinforced with fiber to form a polymer matrix composite (PMC). SMP may be used to provide shear strain relief for multiple metal layers.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1 is a section view of a metal/SMP roll-up wing including means for thermally activating the SMP to facilitate packaging and deployment in accordance with the present invention;

FIGS. 5a through 5c are plots of wing stiffness for different configurations of the deployed roll-up wing;

FIGS. 6a through 6c are different embodiments of a Polymer Matrix Composite (PMC) including a SMP matrix reinforced with fibers;

FIG. 7 is an embodiment of a multi-layer metal laminate in which the SMP provides sheer strain relief; and FIGS. 8a-8b illustrate an embodiment of a roll-up wing including both top and bottom metal/SMP roll-up wing structures.

DETAILED DESCRIPTION OF THE INVENTION

Figure 2A:
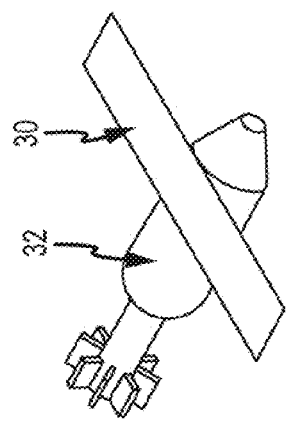
FIGS. 2a through 2f are a sequence of diagrams illustrating the packaging, storage and deployment of the roll-up wings.

The present invention describes a roll-up wing for fitment-constrained air vehicles, and more particularly to wings for tube and pylon launched missiles, projectiles and unmanned aerial vehicles (UAVs) or micro aerial vehicles (MAVs). The roll-up wing preferably occupies minimal storage volume while providing greater surface area (longer chord length or greater span) than would be achievable with conventional retractable wings. To be effective, the roll-up wing must accurately return to its original deployed position without additional mechanical actuation and be stiff enough to carry flight loads over the design envelope of the wing and air vehicle. Due to their mass, velocity and precision maneuvers, the flight loads associated with projectiles and certain missiles far exceeds those experienced by typical MAVs. These vehicles may reach transonic speeds (approximately Mach 0.8 to 1.2).

We considered both the "bendable wing" and a SMP wing structure as possible solutions but found both to be lacking for different reasons. Although conceptually attractive, the motive force provided by a SMP wing structure is simply too small to deploy a wing under normal flight loads (e.g. the gravitation and atmospheric loads are too large). In the 'bendable wing', if the resilient material is one or more metal layers if the metal is thick enough to carry the flight loads (except for the smallest MAVs) the metal will yield when rolled up around the air vehicle. If the resilient material is a polymer of the types taught in U.S. Pat. No. 7,331,546, when the layer is rolled up considerable macroscopic strain energy will be stored in the layer. This strain energy is required to return the wing to its original position. Unfortunately, the storage of such strain energy for even short periods of time e.g. a few days causes the polymer to acquire a "permanent set". Consequently, when the wings are released they do not accurately return to the original position.

We then considered a simple laminate of metal and polymer layers. The metal layer may provide sufficient stored strain energy to return the wing to its original deployed position. The polymer layer reinforces the metal layer to carry flight loads. Unfortunately, this approach is still not effective. The polymer layer will acquire a permanent set, preventing the wing from being accurately returned to its original deployed position. If a polymer is to be used to reinforce the metal layer, a configuration and methodology in which the polymer does not acquire a permanent set during the storage life of the aerial vehicle is necessary.

The solution is accomplished with a laminated wing structure including at least one layer of metal material and at least one layer of a shape memory polymer (SMP) material. The metal layer(s) must each be thin enough to remain below the yield point when rolled up. The metal layer may be formed to have a curved surface in a deployed position to increase stiffness. The SMP material is characterized by a glass transition band Tg above which the SMP material is in an elastomeric state and below which the material is in a glassy state. A first means is provided for heating the SMP material to a temperature in the glass transition band Tg to roll the wing around the air vehicle into a stored position. The SMP material cools to its glassy state for storage. By "packing" the SMP material while in its transition band minimal strain energy is stored in the material. The stored energy is attributable only to the microscopic energy stored in the molecular strands. Macroscopic strain energy that would be stored if the SNAP were packed in either its glassy or elastomeric states is not present. As a result, the SMP material will not acquire a permanent set within the storage life of the vehicle and the wing may be accurately returned to the original deployed position. However, to avoid permanent set the SMP material will not have sufficient strain energy to return the wing to its deployed position under expected flight loads. In preparation for launch, a second means heats the SMP material to a temperature in or above the glass transition band Tg softening the SMP and allowing the strain energy stored in the layer(s) of metal material to return the wing to its deployed position at launch. The SMP's memorized state suitably corresponds to the wing's deployed position so that the SNIP does not resist deployment. Once deployed, the SMP material will typically cool and transition to its glassy state. The laminated wing is stiff enough to carry flight loads. The SMP material may be reinforced with fiber to form a polymer matrix composite (PMC) layer. The SMP may be used to provide shear strain relief for multiple metal layers. By offloading the motive force required to return the wing to its original deployed position from the SMP to the metal, the SMP does not acquire a permanent set and the wing may be deployed accurately.

An embodiment of a roll-up wing 10 is illustrated in FIG. 1. Wing 10 is a laminate of one or more layers 12 of metal material and one or more layers 14 of SMP. The laminate roll-up wing exhibits the same aerodynamic properties as a fixed or retractable wing. The wing must provide enough stiffness, e.g. at least a specified minimum stiffness, to withstand expected load conditions. In certain application, the specified minimum stiffness may have a temporal profile that changes over time depending on, for example, the velocity of the air vehicle. For example, an aerial vehicle (and the laminated wing) may be deployed at a relatively low speed and then boosted to a much higher speed. Alternately, the maneuvers performed by the flight vehicle may become more demanding, thus presenting greater flight loads to the wing. Consequently, the required stiffness of the wing at deployment may be considerably less than the required stiffness during flight or terminal operations.

Wing 10 can be described by its length ("semi-span") measured from the "root" where the wing attaches to the air vehicle to the tip, width ("chord length') measured at the root from the leading edge to the trailing edge and cross-section as well as its taper, twist and camber. "Taper" indicates the rate of change of the chord length along the half-span of the wing from the root where the wing attaches to the airframe to the tip of the wing. Wings are tapered to control the distribution of lift along the wing span. "Twist" indicates the rotation of the cross-section along an axis through the half-span of the wing. Twist is provided to avoid stalling the aircraft along the entire span of the wing, allowing the pilot or control system time to recover. "Camber" is the asymmetry between the top and the bottom curves of the wing in cross-section. Camber affects the lift and pitching moment of the wing. Camber may vary from wing root to wing tip. The laminate of metal and SMP exhibits a stiffness of at least a specified minimum stiffness for the air vehicle and designed for flight conditions. Finally, roll-up wing 10 must accurately return to its original deployed position without additional mechanical actuation.

In the laminate, the number of metal layers 12 and layer thickness may be determined by a combination of the specified minimum stiffness for the wing, diameter of the air vehicle (i.e. required radius of curvature), and metal properties, i.e. yield strength. The metal may be selected from steel, stainless steel, titanium, nickel, aluminum or other suitable metals. The thickness of the individual layers of metal is less than the "yield point" for the radius of curvature. Simply stacking metal layers to increase stiffness poses the same problem as using a single thicker metal layer; thick metal will not roll without yielding. As will be described below, this problem can be overcome by using the SMP between metal layers to provide sheer strain relief. The metal layer or layers may be flat or curved. Curvature increases the bending stiffness of the layer. Different layers may have the same curvature (e.g. both downward) or opposite (e.g. downward and upward) and may have the same or different radius of curvature. The total thickness of the one or more layers is enough to store sufficient strain energy when rolled to unroll and deploy the wing.

In the laminate, the number of SMP layers 14 and layer thickness may be determined by a combination of aerodynamic requirements and available wing storage space. We assume the SMP layer can tolerate whatever bending strains occur, because polymers are naturally able to withstand much larger strains than metals (at least an order of magnitude more). The SMP layer(s) is suitably manufactured so that the original or "memorized" shape is that of the deployed wing. Consequently, when the SMP is in its transition band or elastomeric state it tends to relax to the deployed position.

Virtually any polymer family can be made in an SMP formulation today. SMPs are stable (mechanically/chemically/thermally) above and below the glass transition. In its glassy state, the SMP is stiff but not brittle. In its elastomeric state, the SMP is rubbery or malleable but does not lose its physical integrity. Young's Modulus quantifies the elasticity of the polymer. It is defined, for small strains, as the ratio of rate of change of stress to strain. A polymer's Young's Modulus in its glassy state is typically at least 2-3 orders of magnitude greater than in its elastomeric state e.g., the polymer is much stiffer or rigid.

Several known polymer types exhibit shape memory properties including but not limited to epoxy, styrene, polyurethane, bismolyimide and cyanate ester. SMP may or may not be cross-linked. One of the best known and best researched polymer types to date, that exhibits shape memory polymer properties is polyurethane polymers. Gordon, Proc of First Intl. Conf. Shape Memory and Superelastic Tech., 115-120 (1994) and Tobushi et al., Proc of First Intl. Conf. Shape Memory and Superelastic Tech., 109-114 (1994) exemplify studies directed to properties and application of shape memory polyurethanes. Another polymeric system based on crosslinking polyethylene homopolymer was reported by S. Ota, Radial. Phys. Chem. 18, 81 (1981). A styrene-butadiene thermoplastic copolymer system was also described by Japan Kokai, JP 63-179955 to exhibit shape memory properties. Polyisoprene was also claimed to exhibit shape memory properties in Japan Kokai JP 62-192440. Another known polymeric system, disclosed by Kagami et al., Macromol. Rapid Communication, 17, 539-543 (1996), is the class of copolymers of stearyl acrylate and acrylic acid or methyl acrylate. Other SMP polymers known in the art includes articles formed of norbornene or dimethaneoctahydronapthalene homopolymers or copolymers, set forth in U.S. Pat. No. 4,831,094. Additionally, styrene copolymer based SMPs are disclosed in U.S. Pat. No. 6,759,481 which is incorporated herein by reference.

At typical operating or environmental temperatures, the SMP is in its glassy state. Heat must be applied to thermally activate the SMP to enter its transition band or elastomeric state. For packaging, it is important that the SMP is in its transition band to minimize the strain energy that is stored when the wing is rolled around the fuselage of the aerial vehicle. For deployment, the SMP may be activated in either its transition band or elastomeric state. As shown in FIG. 1, an embodiment for a thermal activation unit includes a number of wires 20 embedded in the SMP and a power source 22. Electrical current passes through the wires thereby resistively heating the SMP. Alternately, conductive nano- or micronparticles may be mixed into the SMP and an electric or magnetic field applied to heat the SMP. The same means for thermal activation is suitably used for both "packaging" and "deployment" but it is not required.

Figure 4:
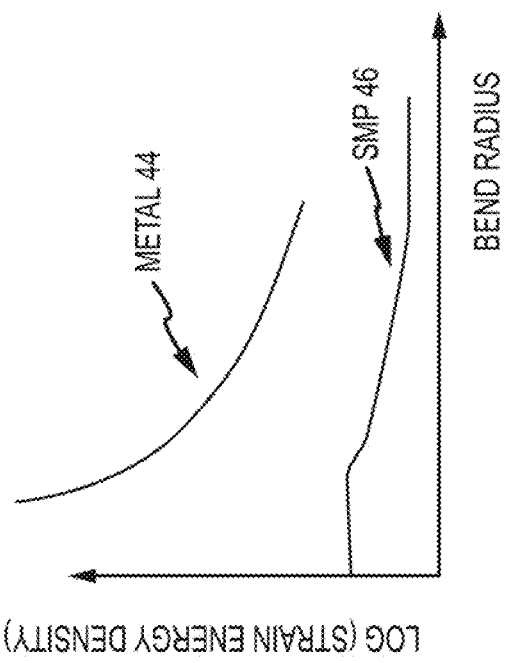
FIG. 4 is a plot of strain energy density versus bend radius for an exemplary metal and an exemplary SMP.

An embodiment of a complete sequence of "packaging", "storing" and "deploying" a roll-up wing 30 on an aerial vehicle 32 is depicted in FIGS. 2a through 2f. The properties for "packaging" the SMP with minimal strain energy to avoid permanent set are depicted in FIGS. 3 and 4, the properties for "storing" sufficient strain energy in the metal layers to deploy the wing are depicted in FIG. 4 and the stiffness properties of the deployed laminate wing and constitute metal and SMP components are depicted in FIGS. 5a through 5c for three exemplary wing laminates.

As shown in FIG. 2a, aerial vehicle 32 is provided with wing 30 in its deployed position. As mentioned, the SMP layer(s) are suitably manufactured so that their original or memorized state is the deployed position. In this embodiment, the aerial vehicle is a tube-launched projectile that may attain transonic or near transonic velocities when launched. Alternately, the vehicle could be a tube or pylon launched missile, UAV or MAV.

Figure 2B:
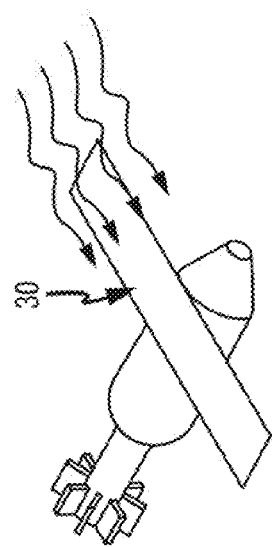
Figure 3:
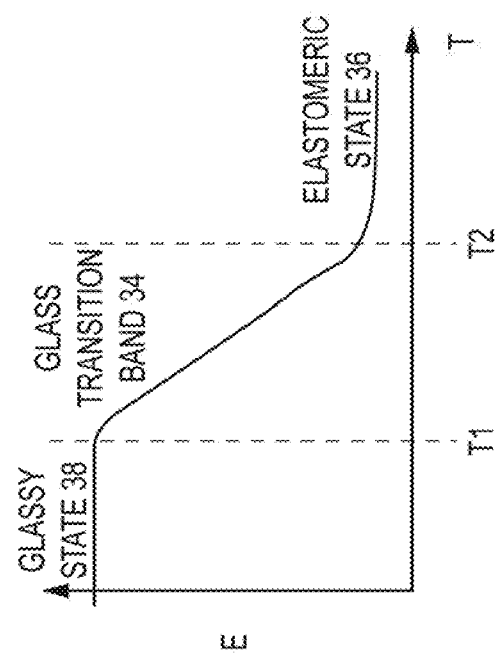
FIG. 3 is a plot of Young's modulus versus temperature for the SMP.

As shown in FIGS. 2b and 3, the SMP in wing 30 is thermally activated to reside in its glass transition band Tg 34 (e.g. at a temperature T between T1 and T2) between its elastomeric state 36 and glassy state 38. In the Tg band the shape recovery effect, or "memory" of the material, is at its minimum. Polymer chains slip relative to one and other more easily in the Tg band than at any other temperature.

Figure 2C:
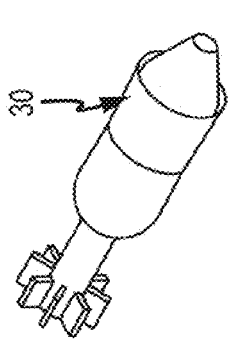
Figure 2F:
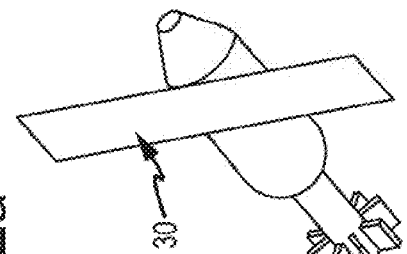

Once activated, the wing is "packaged" by rolling it up around the fuselage of the aerial vehicle as shown in FIG. 2c. In general, the wings are rolled in the direction of any curvature of the metal layer e.g. a metal layer having a concave curvature facing downward is suitably rolled down and around the vehicle. This is done to prevent the curved metal from buckling. If the laminate includes multiple metal layers having opposite facing curvatures, the wing is suitably rolled in the direction of the largest curvature and the opposite curvatures are selected so that they do not buckle. Because the wings are rolled around the fuselage they may be configured to have a chord length greater than the diameter of the fuselage and a span greater than the length of the fuselage. The capability to provide greater surface area in fitment-constrained flight vehicles is quite useful The aerial vehicle and packaged wing are then prepared for storage in a launch tube 40. As the storage life of these vehicles may be several years (e.g. 5-10 years or more), once packaged thermal activation is removed and the SMP cools and transitions to its glassy state. Some type of holding mechanism 42 such as a band around the wing or clips holding the tips of the wing may be used to hold the wings tightly around the fuselage. This may be done to keep the wings from rubbing on the inside of launch tube 40 as shown in FIG. 2d. In other embodiments, holding the wings against the fuselage may be desirable to minimize storage volume or to keep the wing from becoming entangled in other structures.

As shown in FIG. 4, the strain energy density 44 stored in the metal is much greater than the strain energy density 46 stored in the SMP. Our approach of packaging the SMP in its glass transition band minimizes the strain energy density, thus minimizing the memory effect. Some studies suggest that SMPs may take a permanent set after several years e.g. 5-10. Manufacturers have demonstrated at least 95% shape recovery after 5 years and claim 99% shape recover is possible for longer periods. Permanent set is what limits shape recovery. Consequently, the less permanent set the greater the shape recovery. The critical aspect being that the shape recovery of the SMP, hence the wing is greater than a specified tolerance at the storage lifetime of the air vehicle. This ensures that when unrolled the wing will accurately return to its deployed position. This is in sharp contrast to the conventional polymers employed in the 'bendable wing' which have limited shape recovery after only a few days. The holding mechanism 42 may also have the effect of restraining the strain energy stored in the metal from trying to unroll the wing while the SMP is in its glassy state. If not restrained, this could have the effect of deforming or possibly fracturing the SMP.

Figure 2E:
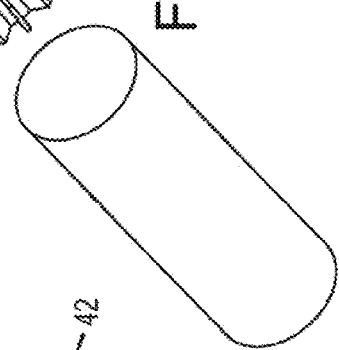
Figure 2D:
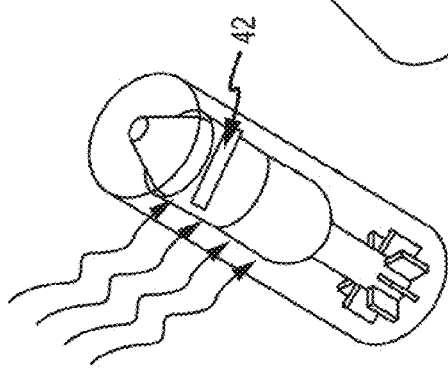

Just prior to or possibly at launch, the SMP is thermally activated, either in transition band Tg or in the elastomeric state, to soften the SMP as shown in FIG. 2e. At launch, holding mechanism 42 is released allowing the strain energy stored in the metal to unroll the wing and return the wing to its deployed position as shown in FIG. 2f. During and immediately following deployment when the SMP is still in its elastomeric state or the glass transition band, the metal layer(s) may be the primary load bearing structures and in which case should be designed to withstand (at least temporarily) the flight conditions. Typically, the SMP will cool rapidly post-launch to its glassy state to reinforce the metal layer(s).

The design of a particular laminate wing will depend on many factors including but not limited to the size and weight of the air vehicle, the size and shape of the wing, the deployment and terminal velocities, maneuverability, cost etc. The principle of using a laminate of metal and SMP materials and thermally activating the SMP to both "package" and accurately "deploy" the wing may be implemented in many different ways. Without toss of generality, a few exemplary cases will now be described. As shown in FIG. 5a, the laminate may include a metal layer and a SMP layer that together meet or exceed the specified minimum stiffness. In this example, neither layer by itself provides the requisite stiffness. As shown in FIG. 5b, the laminate may include a layer of PMC including a SMP reinforced with fiber to increase wing stiffness. The PMC layer(s) may or may not by themselves provide the requisite stiffness. In this configuration, the metal may be primarily used to deploy the wing. As shown in FIG. 5c, the laminate may include a plurality of metal layers separated by one or more layers of SMP. The SMP layer(s) provides sheer strain relief between multiple metal layers. The SMP layers(s) may or may not contribute significantly to the overall stiffness.

The wing stiffness may be increased dramatically with a PMC layer including a SMP matrix reinforced with fibers. The fibers may, for example, be carbon or glass fibers and may be long strands or short fiber segments. PMC using conventional polymer matrices reinforced with fibers are well known. Fiber reinforcement lay-ups are commercially available. The process for introducing the fiber reinforcement lay-up into the SMP matrix would be the same, or at least very similar, to that used with standard polymer matrix composites.

As shown in FIG. 6a, cut glass fibers 50 are mixed into a SMP matrix 52 to form a PMC layer 54. The lay-up can have an arbitrary mass fraction of cut glass fiber e.g. 10%, 20, 30% and so forth, depending on the level of reinforcement required.

As shown in FIG. 6b, continuous parallel fibers 60 are laid up into a SMP matrix 62 to form a PMC layer 64. For example, carbon fiber-epoxy sheets are available off the shelf in various thicknesses that can be used as the lay-up. The fibers generally only enhance the stiffness in the direction of the fibers.

As shown in FIG. 6c, multiple sets of parallel fibers 70 are rotated and laid up into a SMP matrix 72 to form a PMC layer 74. This provides a so-called "quasi-isotropic" lay up that increases stiffness in multiple directions. A true isotropic structure would be equally stiff in all directions within the plane. The "quasi-isotropic" PMC layer may be fabricated by stacking multiple lay-ups of continuous parallel fibers at different rotation angles and then set the lay-ups into the SMP matrix.

As shown in FIG. 7, a laminated wing 80 includes a plurality of layers of metal material 82 and 84 separated by a layer of SMP 86. In this configuration, each layer of metal is thin enough that it does not yield when rolled around the fuselage. The SMP provides shear strain relief between the two metal layers and does not take a permanent set over the lifetime of the vehicle. Without the SMP the shear strain at the interface of the metal layers may cause them to yield as if they were a single thicker layer.

As shown in FIGS. 8a and 8b, a roll-up wing 90 includes both a top metal/SMP wing structure 92 and a bottom metal/SMP wing structure 94. Either or both wing structures may be configured as any of the above cases described or other. As shown in FIG. 8a, when rolled wing 90 flattens out. When unrolled, the top and bottom wing structures accurately return to the deployed position to form the aerodynamic wing.

While several illustrative embodiments of the invention have been shown and described, numerous variations and alternate embodiments will occur to those skilled in the art.

Such variations and alternate embodiments are contemplated, and can be made without departing from the spirit and scope of the invention as defined in the appended claims.

We claim:

1. A roll-up wing for an air vehicle, comprising:
   at least one layer of metal material;
   at least one layer of a shape memory polymer (SMP) material on said at least one layer of metal material, said SMP material characterized by a glass transition band Tg above which the SMP material is in an elastomeric state and below which the material is in a glassy state;
   a first means for heating the SMP material to a temperature in the glass transition band Tg to roll the wing around the air vehicle to a stored position, said SMP material cooling to transition to its glassy state while in the stored position; and
   second means for heating the SMP material to a temperature in or above the glass transition band Tg allowing strain energy stored in the layer of metal material to return the wing to a deployed position.

2. The roll-up wing of claim 1, wherein once the wing returns to the deployed position the SMP material cools and transitions to its glassy state.

3. The roll-up wing of claim 1, wherein each of said at least one layer of metal material has a thickness less than the yield point for the radius of curvature in the stored position, said at least one layer of SMP material storing insufficient strain energy to return the wing to its deployed position or to acquire a permanent set over a specified lifetime that would prevent the wing from returning to its deployed position.

4. The roll-up wing of claim 1, wherein neither the at least one layer of metal material nor the at least one layer of SMP has a stiffness at least equal to a specified minimum stiffness, said layers of metal and SMP together having a stiffness at least equal to the specified minimum stiffness.

5. The roll-up wing of claim 1, wherein at least one said layer of SMP is reinforced with fiber to form a layer of polymer matrix composite (PMC).

6. The roll-up wing of claim 1, wherein a plurality of layers of metal material are separated by at least one said layer of SMP, said SMP providing shear strain relief between said layers of metal.

7. The roll-up wing, of claim 1. further comprising a mechanism that holds the wing in the stored position, said mechanism being released to allow the strain energy in the at least one layer of metal material to return the wing to its deployed position.

8. The roll-up wing for of claim 1, wherein said first and second means tor heating comprise the same said means.

9. The roll-up wing of claim 8, wherein said means for heating comprises resistive elements embedded in the SMP material and a power source for supplying power to the resistive elements to resistively heat the SMP material.

10. The roll-up wing of claim 1, wherein the at least one layer of SMP has a memorized shape corresponding to the deployed position of the wing.

11. A roll-up wing for an air vehicle, comprising:
    at least one layer of metal material;
    at least one layer of a polymer matrix composite (PMC) including a shape memory polymer (SMP) matrix and fiber reinforcement in said matrix; and
    a thermal activation unit configured to heat the SMP matrix to a temperature in its glass transition band Tg to roll the wing around the air vehicle to a stored position in which the at least one layer of metal stores strain energy and to heat the SMP material to a temperature in or above its glass transition band Tg allowing the strain energy stored in the at least one layer of metal material to return the wing to a deployed position.

12. The toll-up wing of claim 11, wherein said at least one layer of PMC in the deployed position has stiffness at least equal to a specified minimum stiffness for the wing.

13. The roll-up wing of claim 11, wherein the fiber reinforcement is oriented in the SMP matrix so that the fibers are deformed in a radius of curvature with the SMP matrix when rolled around the air vehicle.

14. A roll-up wing for an air vehicle, comprising:
    at least one layer of a shape memory polymer (SMP) material;
    a plurality of layers of metal material separated by said at least one layer of SMP material;
    a thermal activation unit configured to heat the SMP material to a temperature in its glass transition band Tg to roll the wing around the air vehicle to a stored position in which the layers of metal stores strain energy and to heat the SMP material to a temperature in or above its glass transition band Tg allowing the strain energy stored in the layers of metal material to return the wing to a deployed position.

15. The roll-up wing of claim 14, wherein said plurality of layers of metal material in the deployed position together have a stiffness at least equal to a specified minimum stiffness for the wing.

16. A method of packaging, storing and deploying a roll-up wing for an air vehicle, comprising:
    providing a wing in a deployed position from an air vehicle, said wing including a laminate of at least one layer of metal material and at least one layer of a shape memory polymer (SMP) material, said SMP characterized by a glass transition band Tg above which the SMP material is in an elastomeric state and below which the material is in a glassy state;
    heating the SMP material to a temperature in its glass transition band Tg;
    with the SMP material in its glass transition band, rolling the wing from the deployed position around the air vehicle into a stored position;
    allowing the wing to cool whereby the SNIP material transitions to its glassy state for storage; and
    heating the SMP material to a temperature in or above its glass transition band Tg whereby at launch strain energy stored in the rolled up layer of metal material unrolls the wing to its deployed position.

17. The method of claim 16, further comprising:
    once deployed, allowing the SMP material to cool and transition to its glassy state.

18. The method of claim 17, wherein the SMP material is reinforced with fiber to form a polymer matrix composite (PMC).

19. The method of claim 17, wherein multiple layers of metal material are separated by said at least one layer of SMP.

20. The method of claim 17, wherein the at least one layer of SMP has a memorized shape corresponding to the deployed position of the wing.

* * * * *